(12) United States Patent
Kreutzer et al.

(10) Patent No.: US 11,015,688 B2
(45) Date of Patent: May 25, 2021

(54) BALL SCREW DRIVE

(71) Applicant: SCHAEFFLER TECHNOLOGIES AG & CO. KG, Herzogenaurach (DE)

(72) Inventors: Mario Kreutzer, Sonneberg (DE); Gerd Sanewski, Erlangen (DE); Nadine Kliemann, Herzogenaurach (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 458 days.

(21) Appl. No.: 15/747,786

(22) PCT Filed: Jul. 14, 2016

(86) PCT No.: PCT/DE2016/200322
§ 371 (c)(1),
(2) Date: Jan. 26, 2018

(87) PCT Pub. No.: WO2017/020899
PCT Pub. Date: Feb. 9, 2017

(65) Prior Publication Data
US 2018/0209521 A1 Jul. 26, 2018

(30) Foreign Application Priority Data
Aug. 4, 2015 (DE) .......................... 102015214859.9

(51) Int. Cl.
*F16H 25/22* (2006.01)
*F16H 25/20* (2006.01)

(52) U.S. Cl.
CPC ..... *F16H 25/2223* (2013.01); *F16H 25/2219* (2013.01); *F16H 2025/2081* (2013.01); *F16H 2025/2096* (2013.01)

(58) Field of Classification Search
CPC .......................... F16H 25/2219; F16H 25/2223
See application file for complete search history.

(56) References Cited

U.S. PATENT DOCUMENTS 2,298,011 A * 10/1942 Hoffar ................. F16C 33/3713
74/424.87
2,455,368 A * 12/1948 Hoffar ................. F16H 25/2204
74/424.86
(Continued)

FOREIGN PATENT DOCUMENTS

CN 102906457 A 1/2013
CN 104813073 A 7/2015
(Continued)

OTHER PUBLICATIONS

International Search Report for International Application No. PCT/DE2016/200322 dated Oct. 20, 2016.

*Primary Examiner* — William Kelleher
*Assistant Examiner* — Gregory T Prather
(74) *Attorney, Agent, or Firm* — Brooks Kushman P.C.

(57) ABSTRACT

A ball screw drive comprising a leadscrew that has at least one outer ball groove and comprising a threaded nut that has at least one inner ball groove, which ball grooves together to form a ball channel in which balls, via which the leadscrew is guided relative to the threaded nut, are accommodated, wherein in the ball groove of the threaded nut is provided at least one radially closed pocket in which a deflection element for deflecting the balls moving in the ball groove is accommodated, wherein the threaded nut has an outer deflection device, which outer deflection device is axially in front of the deflection element in the form of an individual deflection element, is situated on the outer side of the threaded nut and engages in two radial openings in the threaded nut, and by means of which outer deflection device the balls are axially offset.

9 Claims, 3 Drawing Sheets

(56) References Cited

U.S. PATENT DOCUMENTS

| | | | | |
|---|---|---|---|---|
| 2,618,166 | A * | 11/1952 | Douglas | F16H 25/2223 74/424.87 |
| 3,902,377 | A * | 9/1975 | Lemor | F16H 25/2219 74/424.86 |
| 4,841,796 | A * | 6/1989 | Teramachi | F16H 25/2223 74/424.86 |
| 5,142,929 | A * | 9/1992 | Simpson, III | F16H 25/2214 74/424.87 |
| 5,467,662 | A * | 11/1995 | Lange | F16C 19/505 74/424.83 |
| 5,749,265 | A * | 5/1998 | Namimatsu | F16H 25/2204 74/424.75 |
| 6,176,149 | B1 * | 1/2001 | Misu | F16C 33/3706 384/45 |
| 9,091,336 | B2 | 7/2015 | Lin et al. | |
| 2002/0028122 | A1 * | 3/2002 | Kuo | F16H 25/2219 411/429 |
| 2002/0063014 | A1 * | 5/2002 | Yoshida | F16D 1/0858 180/444 |
| 2003/0051569 | A1 * | 3/2003 | Kapaan | F16H 25/2223 74/424.85 |
| 2003/0066372 | A1 * | 4/2003 | Kobayashi | F16H 25/2223 74/424.82 |
| 2004/0211280 | A1 * | 10/2004 | Nishimura | F16H 25/2219 74/424.82 |
| 2005/0000309 | A1 | 1/2005 | Perni et al. | |
| 2005/0076733 | A1 * | 4/2005 | Yamamoto | B62D 5/0448 74/424.87 |
| 2007/0006676 | A1 * | 1/2007 | Mizuhara | B62D 5/0448 74/424.86 |
| 2007/0295132 | A1 * | 12/2007 | Lin | F16H 25/2223 74/424.86 |
| 2010/0043583 | A1 * | 2/2010 | Fukano | F16H 25/2219 74/424.87 |
| 2010/0132494 | A1 * | 6/2010 | Sugita | F16H 25/2223 74/424.87 |
| 2011/0252908 | A1 * | 10/2011 | Lin | F16H 25/2219 74/424.86 |
| 2012/0080257 | A1 * | 4/2012 | Lee | F16H 25/2219 180/443 |
| 2013/0199324 | A1 * | 8/2013 | Piltz | F16H 25/2214 74/424.86 |
| 2013/0283953 | A1 * | 10/2013 | Iwasaki | F16H 25/20 74/424.87 |
| 2014/0144263 | A1 * | 5/2014 | Yoshioka | F16H 25/2021 74/89.23 |
| 2014/0352472 | A1 * | 12/2014 | Hsieh | F16H 25/2219 74/424.87 |
| 2015/0151780 | A1 * | 6/2015 | Fujita | F16H 25/2219 74/424.87 |
| 2015/0321690 | A1 * | 11/2015 | Yamaguchi | B62D 5/0448 180/444 |
| 2016/0091066 | A1 * | 3/2016 | Suzuki | F16H 25/22 74/424.82 |
| 2016/0186845 | A1 * | 6/2016 | Lin | F16H 25/2219 74/424.81 |
| 2016/0207566 | A1 * | 7/2016 | Ito | F16H 25/2219 |
| 2016/0341291 | A1 * | 11/2016 | Suzuki | F16H 25/2219 |
| 2017/0259844 | A1 * | 9/2017 | Asakura | F16H 7/023 |
| 2017/0268643 | A1 * | 9/2017 | Burpee | F16H 25/2219 |
| 2017/0349205 | A1 * | 12/2017 | Kaneko | B62D 5/0448 |
| 2018/0149245 | A1 * | 5/2018 | Yamashita | F16H 25/2214 |
| 2019/0136947 | A1 * | 5/2019 | Nakayama | B62D 5/0424 |
| 2019/0168799 | A1 * | 6/2019 | Ogata | B62D 5/0448 |
| 2019/0211906 | A1 * | 7/2019 | Yang | F16H 25/2219 |
| 2019/0360569 | A1 * | 11/2019 | Yorozu | F16H 25/22 |
| 2019/0382046 | A1 * | 12/2019 | Mrozek | B62D 5/0424 |
| 2019/0383369 | A1 * | 12/2019 | Levin | F16H 25/2261 |
| 2020/0063839 | A1 * | 2/2020 | Durbin | F16C 19/16 |
| 2020/0240496 | A1 * | 7/2020 | Suzuki | F16H 25/2223 |

FOREIGN PATENT DOCUMENTS

| | | |
|---|---|---|
| DE | 8108413 U1 | 7/1981 |
| DE | 102005023274 A1 | 11/2006 |
| DE | 102011005244 A1 | 9/2012 |
| DE | 102013106814 A1 | 7/2014 |
| DE | 102013207745 A1 | 10/2014 |
| DE | 102013224461 A1 | 3/2015 |
| EP | 1574753 A1 | 9/2005 |
| JP | 2007327630 A | 12/2007 |
| WO | 03083328 A1 | 1/2003 |

* cited by examiner

BALL SCREW DRIVE

CROSS-REFERENCE TO RELATED APPLICATIONS

This application is the U.S. National Phase of PCT/DE2016/200322 filed Jul. 14, 2016, which claims priority to DE 102015214859.9 filed Aug. 4, 2015, the entire disclosures of which are incorporated by reference herein.

TECHNICAL FIELD

This disclosure relates to a ball screw drive, comprising a lead screw with at least one outer ball groove and a threaded nut with at least one inner ball groove, which ball grooves together form a ball channel in which balls, via which the lead screw is guided relative to the threaded nut, are accommodated, wherein in the ball groove of the threaded nut at least one radially closed pocket is provided in which a deflection element for deflecting the balls moving in the ball groove is accommodated

BACKGROUND

In general, ball screws convert a rotating motion into a displacement (translation). To this end, either the spindle or the nut is connected to a drive, in particular an electromotor, if necessary via an intermediate transmission. When the spindle is rotated by the drive, the nut, which is connected to the spindle via balls arranged in the tracks, is displaced axially, that is in longitudinal direction of the spindle. On the other hand, if the nut is coupled to the drive and rotated via it, the spindle is axially moved by the rotating, but positionally fixed nut.

Ordinarily, several deflection bodies are arranged on the nut, which serve the purpose of the transposition of the balls. To this end, the nut has several, for the most part circumferentially offset openings, into which the deflection bodies, for the most part made of plastic, are inserted. The balls rolling in the ball channel between the lead screw and the threaded nut run over an inlet opening into the deflection body, pass through the deflection body in a corresponding channel or guide segment and run over an outlet opening to an adjacent segment of the ball channel. Thus closed, recirculating balls are formed.

If the threaded nut is driven, it is to be mounted in suitable manner or to be coupled to the drive. Since the nut wall, via the openings in which the deflection bodies are accommodated, is interrupted in several places, either a cylindrical ring is placed on the nut from the outside, via which the mounting takes place. Or, alternatively, the nut is also designed axially correspondingly extended, in order to realize the mounting or coupling possibility to the drive in the extended region.

From DE 10 2013 106 814 A1 and DE 81 08 413 U1 screw drives are known in which case the threaded nut is provided with an inward recess, in which an oblong deflection element extending over several windings of the nut side ball groove is arranged, having several deflection segments arranged adjacent to one another. As an alternative to using such a deflection element, it is also possible to arrange several separate deflection elements axially next to one another. In the case of the drive known from DE 10 2013 106 814 A1, the deflection element is fixed via fastening screws that screw into the deflection element through the nut. In the case of the drive according to DE 81 08 413 U1, the recess and the deflection element are designed such that the balls are guided in segments from the pocket bottom pocket bottom, that is, they run directly to the pocket bottom. Since, in the case of these two drive embodiments the nut side nut ball groove is interrupted over the oblong recess, there is no optimal load distribution to the individual ball rows. This has a negative impact, in particular when the ball screw drive is loaded with transverse forces.

This disclosure addresses the problem of specifying a ball screw drive that is improved in comparison to the known ball screw drives.

SUMMARY

For the solution of this problem, in the case of a ball screw drive of the initially mentioned type, provision is made according to this disclosure that the threaded nut has an outer deflection device, which outer deflection device is axially in front of the deflection element in the form of an individual deflection element, is situated on the outer side of the threaded nut and engages in two radial openings in the threaded nut, and by means of which outer deflection device the balls are axially offset.

The inventive ball screw drive has a combination of an individual deflection element with an outer deflection device on the threaded nut side. The individual deflection element, which may be arranged in the region of an end of the threaded nut, is accommodated in the radially closed pocket. That is, in this region there is a closed exterior of the threaded nut, which makes it possible to configure a corresponding bearing- or drive geometry integrally in this region or adjacent to it. Via the individual deflection element, thus the separate ball row defined by this, a very good support of the threaded nut results in the case of an engaging transverse force, as a result of which the balls of the main deflection, which are translated to the outer deflection device, are in this case relieved.

Adjoining the individual deflection element, axially seen, as close as possible adjacent to said individual deflection device, is an outer deflection which makes it possible to axially translate the balls of the second, long ball row. To this end, the threaded nut has two radial openings in which the outer deflection device engages with a corresponding engagement segment, in order to accommodate balls from the ball channel and to introduce them into translation channel of the outer deflection device or to insert them from said translation channel back into the ball channel. The ball groove of the threaded nut is, in this region—aside from the two radial openings—not interrupted, that is, a very good load distribution to the balls of the long ball row of this main deflection results.

Overall, the inventive combination of at least one such individual deflection element with at least one outer deflection offers several advantages. For one, a very good, uniform load distribution results to the individual ball rows of the balls which the threaded nuts essentially apply, thus those balls which are deflected by the outer deflection device. For another, via the individual deflection element with the radially closed pocket the possibility of configuring an integral bearing- or drive geometry on the screw nut exterior is given, and simultaneously any transverse forces registered in operation are to be supported by the separate ball row of the individual deflection element, so that the balls of the outer deflection element are relieved.

The axial position of the pocket may coincide at least partially with the axial position of a bearing geometry integrally configured on the exterior of the threaded nut, serving the purpose of mounting the threaded nut or the driving of the threaded nut. Since the exterior of the threaded nut is closed in the region of the individual deflection due to the pocket formation as described, it is possible to form an integral bearing or drive geometry on it. This bearing or drive geometry is positioned such that it coincides at least in segments, if necessary also completely with the axial position of the pocket of the individual deflection, thus, radially seen there is an overlap is given. Thus the threaded nut can be designed short axially viewed. An axial extension of the threaded nut required in the past for this purpose is, advantageously, not necessary. A very compact structure results on the part of the threaded nut.

The bearing geometry, which is configured integrally on the nut exterior, may be a rolling element running groove of a support bearing pivoting the threaded nut. That means that ultimately the support bearing inner ring, which is formed over the rolling element running groove, is formed integrally on the nut exterior.

An integral drive geometry can for example be a ring gear, which is formed on the nut exterior nut. This ring gear can for example serve the purpose of engagement of a drive pinion, or the engagement of a drive belt, thus different drive elements with which the threaded nut is driven.

According to an embodiment of this disclosure, the diameter of the balls deflected via the individual deflection element can be smaller than the diameter of the balls deflected via the outer deflection device. Thus, different ball sorts are used, that means that the balls of the ball row of the individual deflection are minimally smaller in diameter than the balls of the ball row of the outer deflection, wherein the diameter difference in the range is a few micrometers. That means that in the normal range, thus if no transverse forces are acting on the threaded nut, the balls of the ball row of the individual deflection are idle, thus running without friction, only the balls of the long ball row bear the outer deflection. Only when a transverse force acts, thus there is a slight tilting of the threaded nut relative to the spindle, do the balls bear the individual deflection, as a result of which the main deflection is relieved, thus protected from overload.

According to a further embodiment of this disclosure, provision can be made that the circumferential position, at which the pocket is developed, and the circumferential positions at which the openings are provided, are different. That means that the pocket and the openings, axially seen are not congruent with one another, thus not flush, so that an improved load distribution results. It is also conceivable to configure the two openings of the outside deflection at different circumferential positions, thus likewise axially seen, to position them not congruent.

The deflection element is to be fixed in the pocket correspondingly. Along with the possibility of fastening the deflection element in the pocket via an adhesive connection, a clamping mounting of the deflection element in the pocket may be provided. Since the pocket, after it is deepened in the ball groove of the threaded mother, is also axially limited, a corresponding clamp mounting of a deflection element is easily possible.

Although for such a clamp mounting the deflection element can be correspondingly measured geometrically viewed, so that it is to be firmly pushed into the pocket in the case of loading of the threaded nut, an expedient further development of the invention provides for providing an elastic clamp segment on one or both sides, which fits in a clamping manner on the walls axially limiting the pocket. Via such an elastic element, which can be designed for example as a laterally protruding spring tongue, a corresponding clamping of the deflection element is ensured. If only one such clamping element is provided, it fits with corresponding preload on a pocket wall, the deflection element fits with its element body on the opposite pocket wall. If corresponding clamp segments are provided on both sides, in each case they fit on opposite pocket walls under corresponding preload.

The width of the pocket itself can, axially seen, extend to the pocket bottom. That means that the pocket is designed at least in segments undercut, which for example can be realized by a trapezoid extension to the pocket bottom. Since the deflection element as described may be accommodated in a clamping manner in the pocket, a good radial fixation of the deflection element is also achieved via this undercut pocket geometry.

In further development of this disclosure, the deflection element can have two centering segments running in circumferential direction, which engage in adjacent segments of the ball groove. Via these centering segments an exact positioning of the deflection element relative to the ball groove of the threaded nut is achieved. Such centering segments are, however, not absolutely necessary, if the deflection element is designed with one or two elastic clamp segments, since an axial centering is also possible via these.

In order to be able to design the threaded nut even shorter, a further development of this disclosure provides that the at least one pocket is open on the front of the threaded nut and has a local radial recess, into which a radial projection of the deflection element engages. That means that the pocket is arranged directly adjacent to the nut front and is open to the front, thus, axially seen, only closed on one side. In order to axially secure the deflection element the pocket has a local radial recess so that a corresponding contact web forms to the front. A corresponding radial projection of the deflection element engages in this radial recess positively and non-positively. This projection abuts the contact web, so that the deflection element in turn is axially fixed. The deflection element otherwise is free on the front of the threaded nut.

As an alternative to the formation of such a local radial recess in the pocket bottom and a corresponding projection on the deflection element, it is also conceivable to arrange an annular retaining element on the threaded nut in the region of the front, thus a type of retaining ring or the like, that closes the open pocket on the front and axially secures the deflection element. In this case, neither the pocket nor the deflection element are to be correspondingly designed, but rather only a corresponding fixation possibility for the annular retaining element, for example a recessed groove or a borehole or the like, wherein the retaining groove or the borehole may be installed in the front of the nut, so that the deflection element can in turn be arranged closed in the front.

Such an inventive ball screw drive is in particular useful as part of an electro-mechanical actuator, e.g. for the steering of a motor vehicle, in which case in the case of the same installation space an increased load bearing capacity is required.

BRIEF DESCRIPTION OF THE DRAWINGS

In the following the invention will be described on the basis of exemplary embodiments referring to the drawings. The drawings are schematic representations and show the following.

DETAILED DESCRIPTION OF THE DRAWINGS

Figure 1:
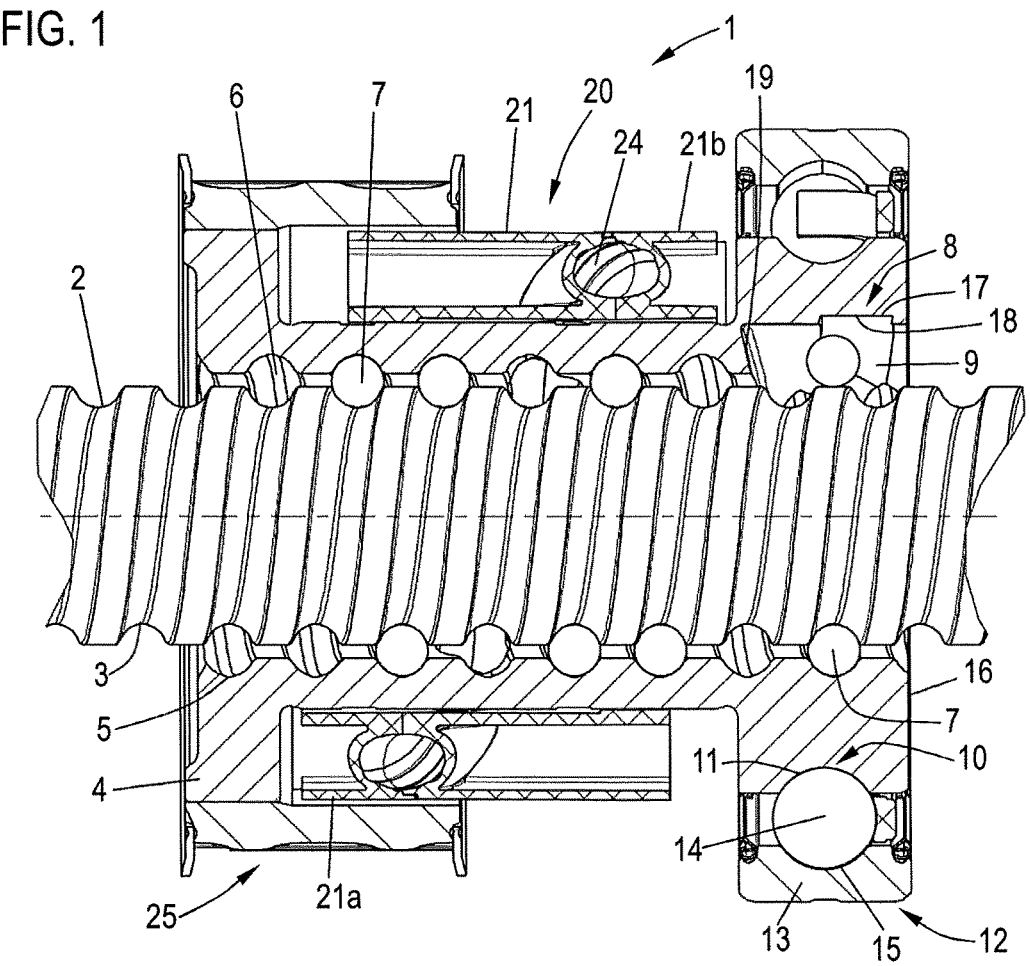
FIG. 1 shows a partial segmental view of an inventive ball screw drive with individual and outer deflection.

FIG. 1 shows an inventive ball screw drive 1 comprising a lead screw 2 with a ball groove 3 on its exterior as well as a threaded nut 4, here shown in section, with a ball groove 5 on its inside. The ball grooves 3 and 5 form in known manner a circumferential ball channel 6 in which balls 7 run.

On the inside of the threaded nut 4, thus in the ball groove 5, a pocket 8 is configured, in which a deflection element 9 is accommodated, used for deflection of the balls 7 from one channel segment to the adjacent channel segment, so that a circumferential closed ball row forms. The deflection element 9 is configured as an individual deflection element, with which the balls 7 are translated from one channel segment to the channel segment directly adjacent to it via the threaded shoulder.

The pocket 8 is radially closed. This makes it possible to integrally configure a bearing geometry 10 on the exterior of the threaded nut 4 in the shown example, shown here in the form of a rolling element running groove 11, which forms the inner ball race of a support bearing 12, via which the threaded nut is supported to an adjacent component or on which it is mounted above. The support bearing 12 comprises an outer ring 13 as well as balls 14, which run in the rolling element running groove 11 and a corresponding running groove 15 on the outer ring 13.

The pocket 8 itself is, axially seen, arranged adjacent to a front 16 of the threaded nut 4. In the case of this exemplary embodiment, the pocket is provided with a local, radial projection 18 for axial fixation of the deflection element 9, while the deflection element has a radial projection 18, which engages in the recess 17. Hereby an axial fixation is achieved, since the projection 18 engages positively and/or non-positively in the recess 17. This embodiment is in particular expedient when, as here, the pocket 8 is, axially seen, open on the front 16. In this case the pocket 8 is only limited on the inside via a pocket wall 19, while it is free on the front 16. The fixation via the recess 17 and the projection 18 are for preventing falling out.

As FIG. 1 shows, the support bearing 12 or the integral bearing geometry 10 is radially above the pocket 8 or the deflection element 9, that means the axial positions coincide here. Any transverse force applied via the support bearing 12 on the lead screw 2 is consequently in this region where the threaded nut is supported against the surroundings, accommodated via the ball row of the individual deflection and hereby the ball row which guides the nut 4 on the lead screw 2, in this case is relieved. In the process, the balls 7 of the individual deflection, that is the balls 7, via which the deflection element 9 is deflected, may be minimally smaller in diameter than the balls 7 via which the threaded nut 4 is guided on the lead screw 2. This results in the balls 7 in the region of the individual deflection running at idle free of friction, as long as no transverse force is given. Then, only the balls 7 bear the main deflection, about which we subsequently go into greater detail. Only in the case of transverse force do the balls 7 also bear the individual deflection and support the threaded nut 4.

The ball screw drive 1 further has an outer deflection device 20 comprising an outer deflection device 21 consisting typically of two separate element segments 21a and 21b, which in suitable manner are connected to one another positively and/or non-positively. The outer deflection element 21 surrounds the threaded nut 4. Said threaded nut has two radial openings 22 (for example, see FIG. 4) in which the corresponding insertion and removal segments 23 of the outer deflection element 21 engage. Via these insertion and removal segments the balls 7 from the ball channel 6 are accommodated and conveyed to the deflection channel 24 of the outer deflection device 21 or placed from the deflection channel 24 back into the ball channel 6. Via this outer deflection device it is possible to axially offset the balls 7 over several thread run-ins, so that a multiple circumferential ball row results, which bears the threaded nut 4. As a consequence of the outer deflection the ball groove 5 of the threaded nut 4 is not interrupted, so that a very good load distribution results over all of the balls 7.

Obviously, the inventive ball screw drive 1 offers, on one hand, the possibility of realizing a uniform load distribution in the region of the main deflection, thus the outer deflection device 20, which bears the threaded nut 4, since the ball groove 5 of the threaded nut 4 is not interrupted. Simultaneously, the configuration of the individual deflection offers the possibility of configuring a bearing or drive geometry on a non-opened region on the nut exterior, e.g. a tooth geometry, which serves the purpose of mounting or driving the threaded nut 4, without arranging additional components here on the nut side.

In FIG. 1 the configuration of a bearing geometry 10 in the form of the rolling element running groove 11 is shown. On the other end of the nut a drive geometry 25 is configured or provided, for example a ring gear exposed to the nut, with which a drive belt or the like meshes.

Figure 2:
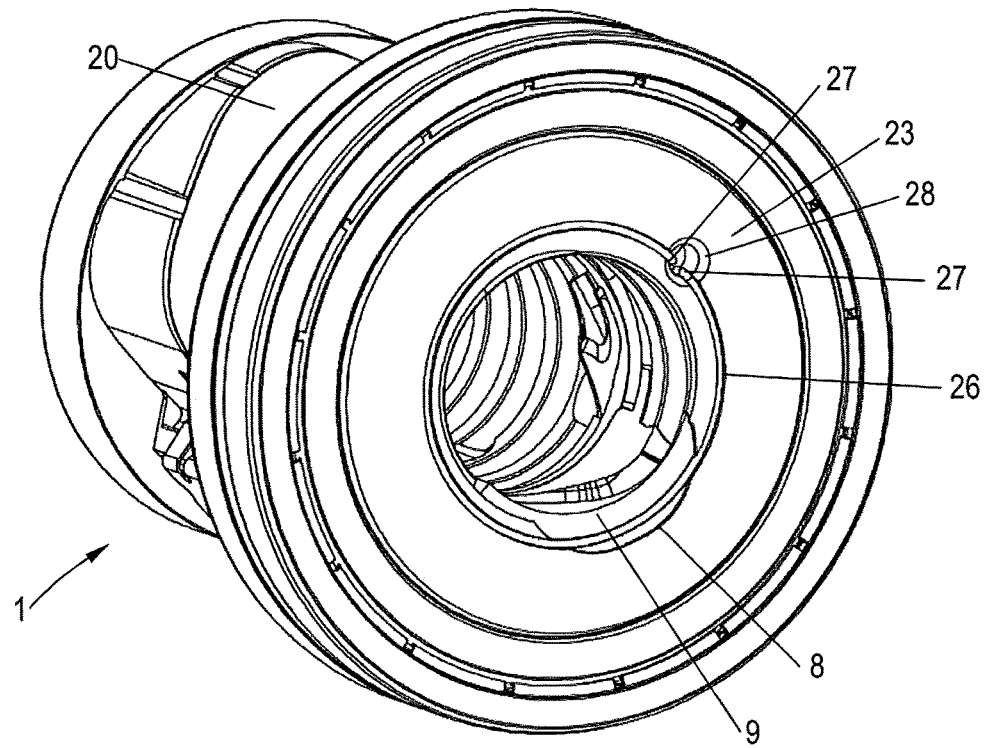
FIG. 2 shows a perspective view of the ball screw drive from FIG. 1 with a first variant of an axial fixation of the individual deflection element.

FIG. 2 shows a front view of a ball screw drive 1, in which case the deflection element 9 of the individual deflection is axially fixed in different manner than described in FIG. 1. The pocket 8 is also axially open here, however not provided with a recess. Instead, here the fixation occurs via an annular locking element 26 which, axially seen, overlaps the deflection element 9 on the front side 16. With its two ends 27 the locking element 26, which here e.g. is made of metal wire, engages in a borehole 28, so that it is fixed.

Figure 3:
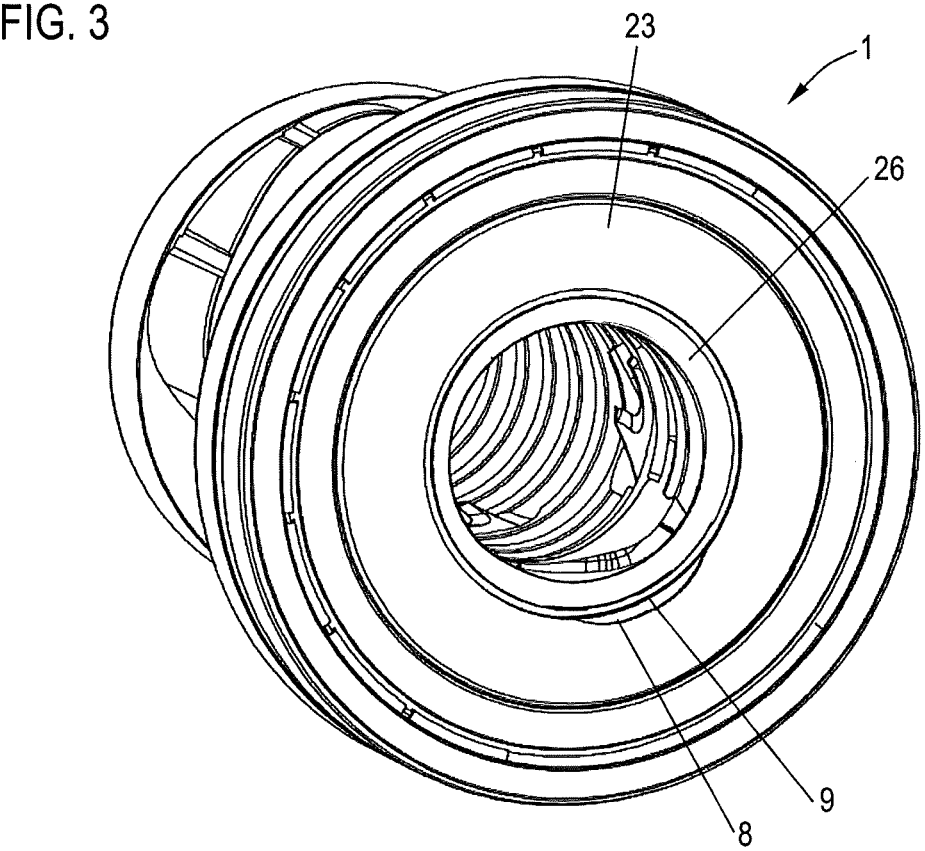
FIG. 3 shows a perspective view of a second embodiment of an inventive ball screw drive with a second variant of the axial fixation of the individual deflection element.
Figure 4:
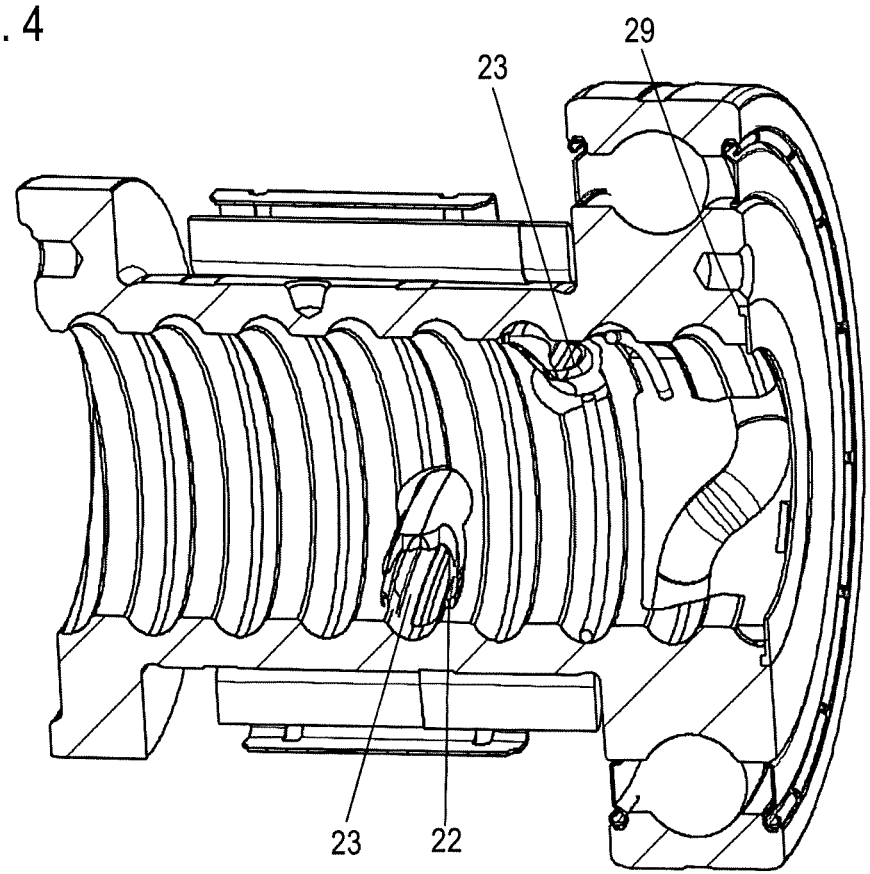
FIG. 4 shows a longitudinal segmental view through the threaded nut from FIG. 3.

FIGS. 3 and 4 show a third embodiment of an axial fixation of the deflection element 9. In the case of the ball screw drive 1 there the pocket 8 is likewise, axially seen, open. For axial fixation, an annular locking element 26 is also provided here, which however here is configured as a wider locking ring, which, see the segmental view according to FIG. 4, is inserted into a corresponding retaining groove 29, which is configured on the front side 16. It overlaps, see FIG. 3, likewise the deflection element 9, so that said deflection element is axially fixed. Such a locking ring can simultaneously have the function of a grease remover or a cover. A small borehole or recess on the nut 4 can be provided for rotation prevention of this locking ring, into which a corresponding locking segment of the locking ring engages.

Figure 5:
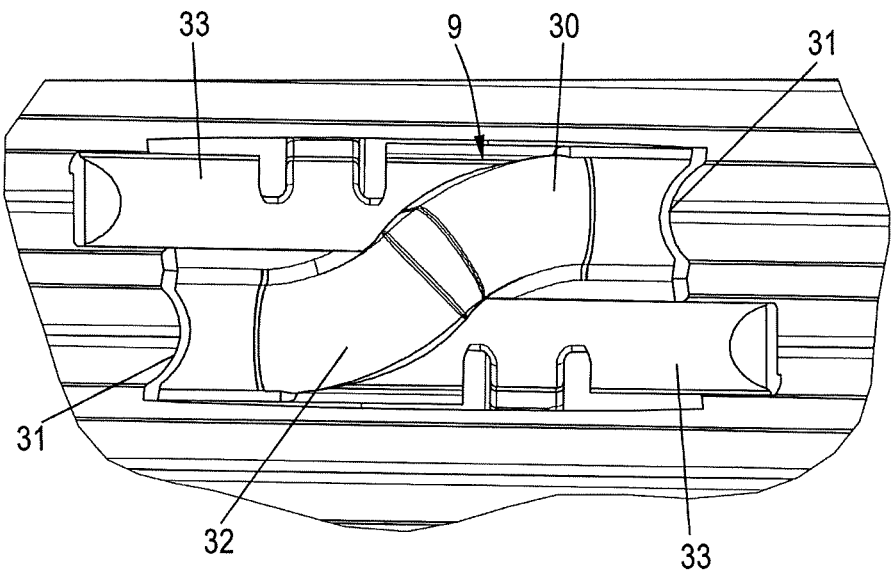
FIG. 5 shows a detailed view of an individual deflection element accommodated in the threaded nut.
Figure 6:
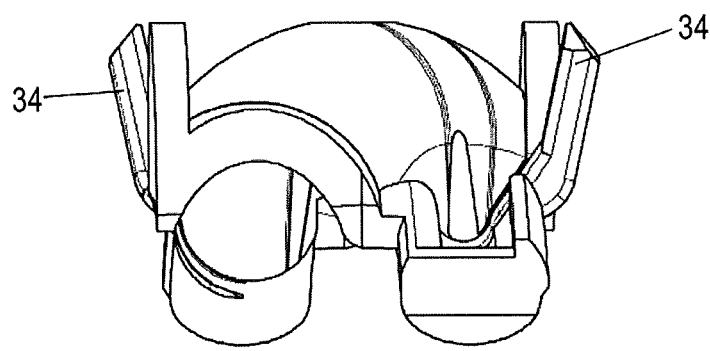
FIG. 6 shows a front view of the deflection element from FIG. 5.
Figure 7:
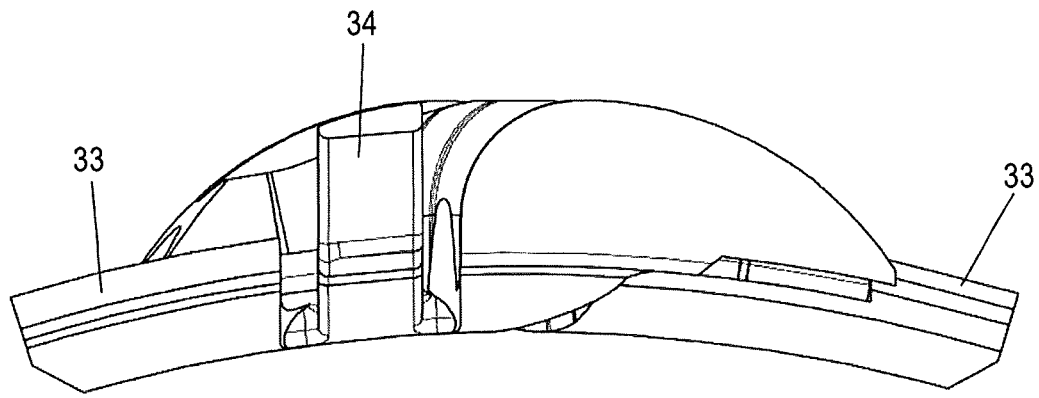
FIG. 7 shows a lateral view of the deflection element from FIG. 5.

The deflection element 9 itself is shown in magnified representation in FIGS. 5-7. It has the actual deflection element 30, at which two inlet and outlet segments 31 are configured, each running into the ball groove 5 and enabling the entry and exit of the balls 7. At the inlet and outlet segments 31 a guide or channel segment 32 adjoins, which runs in serpentine manner and makes it possible to translate the balls 7 from one ball groove segment to the adjacent ball groove segment.

The deflection element 30 has in addition two centering segments which are used for axially centering the deflection element 9 in the ball groove 5. The centering segments 33 likewise engage in the ball groove 5. They are, see FIG. 7, of course designed bent corresponding to the shape of the ball groove.

For clamp fixing of the deflection element 9 in the pocket 8 elastic clamp segments 34 are configured in the shown example on both sides of the deflection element 8, which, see for example FIGS. 6 and 7, are configured as elastic spring tongues. The spring tongues snap in the case of insertion behind the pocket ends 19 which may be undercut, provided the pocket 8 is closed on both sides via such pocket walls 19. Such a pocket closed on both sides can extend in the shape of a trapeze in cross-section to the pocket bottom.

The configuration of two such clamp segments 34 is of course only necessary if the pocket is closed on both sides via axial pocket walls 19. If the pocket 8 is open on the front side, as shown in the case of the previously described exemplary embodiment, a corresponding elastic clamp segment 34 is only to be configured on one side, on the other side the fixation occurs via a corresponding locking element or for example the combination of recess and projection, as described for FIG. 1.

In one embodiment, the deflection element 9, as well as the element segments 21a, 21b of the outer deflection device 21, are made of plastic. In one embodiment, the locking elements 26 are made of metal, for example in the form of a metal wire in the case of the embodiment according to FIG. 2, or made of sheet metal in the case of the design according to FIGS. 3 and 4.

REFERENCE LIST

1 Ball screw drive
2 Lead screw
3 Ball groove
4 Threaded nut
5 Ball groove
6 Ball channel
7 Ball
8 Pocket
9 Deflection element
10 Bearing geometry
11 Rolling element running groove
12 Support bearing
13 Outer ring
14 Ball
15 Running groove
16 Front side
17 Recess
18 Projection
19 Pocket wall
20 Outer deflection device
21 Outer deflection element
21a Element segment
21b Element segment
22 Opening
23 Removal segment
24 Deflection channel
25 Drive geometry
26 Locking element
27 End
28 Borehole
29 Retaining groove
30 Deflection element
31 Outlet segment
32 Guide or channel segment
33 Centering segment
34 Clamp segment

We claim:

1. A ball screw drive, comprising:
a lead screw with at least one outer ball groove; and
a threaded nut with at least one inner ball groove;
wherein the at least one outer ball groove and the at least one inner ball groove together form a ball channel in which balls are accommodated, wherein at least one radially closed pocket is provided in the at least one inner ball groove in which a first deflection element for deflecting the balls moving in the ball groove is accommodated, wherein the threaded nut has a second deflection element axially in front of the first deflection element, wherein the second deflection element is situated on an outer side of the threaded nut and engages in two radial openings in the threaded nut to enable an axial offset of the balls.

2. The ball screw drive according to claim 1, wherein an axial position of the pocket coincides at least partially with the axial position of a bearing geometry integrally configured on the outer side of the threaded nut for mounting the threaded nut or the driving of the threaded nut.

3. The ball screw drive according to claim 2, wherein the bearing geometry is preferably a rolling element running groove of a support bearing pivoting the threaded nut and a drive geometry is a ring gear.

4. The ball screw drive according to claim 1, wherein an opening of the pocket has a different circumferential position than the openings.

5. The ball screw drive according to claim 1, wherein the first deflection element is clamped in the pocket.

6. The ball screw drive according to claim 5, wherein at least one elastic clamp segment is provided on one or both sides on the first deflection element to axially limit the pocket.

7. The ball screw drive according to claim 1, wherein the first deflection element has two centering segments running in a circumferential direction, which engage in adjacent segments of the ball groove.

8. The ball screw drive according to claim 1, wherein the pocket is open on a front of the threaded nut and has a local radial recess into which a radial projection of the first deflection element engages.

9. The ball screw drive according to claim 1, wherein the pocket is open on a front of the threaded nut and an annular locking element is provided for axial or radial fixation of the first deflection element.

* * * * *